US011583763B2

(12) United States Patent
Wakeford et al.

(10) Patent No.: US 11,583,763 B2
(45) Date of Patent: *Feb. 21, 2023

(54) UNLOCKING GAME CONTENT FOR USERS BASED ON AFFILIATION SIZE

(71) Applicant: Kabam, Inc., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 17/172,055

(22) Filed: Feb. 9, 2021

(65) Prior Publication Data

US 2021/0162298 A1 Jun. 3, 2021

Related U.S. Application Data

(63) Continuation of application No. 16/447,516, filed on Jun. 20, 2019, now Pat. No. 10,933,307, which is a continuation of application No. 13/887,973, filed on May 6, 2013, now Pat. No. 10,328,337.

(51) Int. Cl.
*A63F 13/00* (2014.01)
*A63F 13/35* (2014.01)
*A63F 13/73* (2014.01)
*A63F 13/69* (2014.01)
*A63F 13/795* (2014.01)

(52) U.S. Cl.
CPC .............. *A63F 13/35* (2014.09); *A63F 13/69* (2014.09); *A63F 13/73* (2014.09); *A63F 13/795* (2014.09)

(58) Field of Classification Search
CPC ........ A63F 13/12; A63F 13/79; A63F 13/795; A63F 13/55
See application file for complete search history.

(56) References Cited

U.S. PATENT DOCUMENTS

| 2002/0045470 | A1 | 4/2002 | Atsumi |
| 2004/0235567 | A1 | 11/2004 | Chatani |
| 2006/0178968 | A1 | 8/2006 | Jung |
| 2010/0131864 | A1 | 5/2010 | Bokor |
| 2010/0216553 | A1* | 8/2010 | Chudley ................. A63F 13/87 463/42 |
| 2012/0094757 | A1 | 4/2012 | Vago |
| 2012/0142429 | A1 | 6/2012 | Muller |
| 2012/0220373 | A1* | 8/2012 | Cantor .................. A63F 13/533 463/40 |
| 2012/0252579 | A1* | 10/2012 | Sethi ..................... A63F 13/795 463/40 |
| 2019/0299101 | A1 | 10/2019 | Wakeford |

* cited by examiner

*Primary Examiner* — David L Lewis
*Assistant Examiner* — Eric M Thomas
(74) *Attorney, Agent, or Firm* — Esplin & Associates, PC

(57) ABSTRACT

This disclosure relates to unlocking game content for users of an online game. In implementations, affiliations between users may be established, and content may be made available to users individually based on the number of users within an affiliation. Content made available to a first user of the affiliation may be made available to the first user individually and independently from other users included in the affiliation.

18 Claims, 2 Drawing Sheets

UNLOCKING GAME CONTENT FOR USERS BASED ON AFFILIATION SIZE

FIELD OF THE DISCLOSURE

This disclosure relates to unlocking game content for users of an online game, where the content is made available to a user based on the number of users within an affiliation.

BACKGROUND

The popularity of online games has grown over the years. Conventional online games are provided through gaming platforms, such as Facebook.com, Kabam.com, Zynga.com, Bigpoint Games, Steam, etc. Within the online games and/or gaming platforms, gaming communities have developed to promote group-based game play. The gaming communities may be known as affiliations. The affiliations facilitate online game play to perform tasks within the online game, facilitate actions within the online game amongst members of the affiliation, and facilitate actions to compete against other affiliations.

Membership with an affiliation may impact retention of users within the online game. That is, users of an online game that are members of an affiliation may be more likely to spend more time and resources within an online game. Conventional affiliations within online games may be all-inclusive, accepting all users that desire membership to the affiliation, while other affiliations within an online game may be extremely exclusive. Certain affiliations grant memberships to new users based on a need for additional members or based on in-game performance metrics of users. As such, affiliations may become cliques, where membership to an affiliation is hard or impossible for new users to obtain. Additionally, joining an affiliation may seem like a daunting task to new users.

Accordingly, alternative approaches including incentives for users that are members of an affiliation may encourage affiliations to accept new members and/or encourage current members of the affiliation to remain active and/or increase their activity in the online game.

SUMMARY

One aspect of this disclosure relates to unlocking game content for individual users of an online game as the number of users within the affiliation expands. In implementations, if a number of users within an affiliation is greater than a certain number of users, content may be made available to a first user within the affiliation, where the content is made available to the first user individually and independent of other users within the first affiliation. In contrast, conventional online games may provide content to affiliations that are only useful to the affiliation as a whole and not to individual users in their independent gameplay, such as a bigger guild hall to accommodate an affiliation with more users. Thus, individual users within the affiliation may be encouraged to accept new members to the affiliation and/or individual users within the affiliation may remain active in the online game based on content made available to the individual users.

In implementations, a system may include one or more processors configured to execute computer program modules. The computing modules may include a game module, a group module, and a content module.

The game module may be configured to execute an instance of the online game to facilitate presentation of the online game to the users. The game module may be configured to implement in-game actions in the instance of the online game in response to actions requests for the in-game actions from the users. In implementations, the users may include a first user and a discrete set of one or more other users.

The group module may be configured to establish affiliations between the users within the online game. In implementations, the affiliations may include a first affiliation including the first user and the discrete set of one or more other users.

The content module may be configured to determine content in the online game made available to the first user individually based on a number of users within the first affiliation. In implementations, the content is made available to the first user individually and independent of the other users included in the first affiliation.

In implementations, the in-game actions include an affiliation request initiated by the first user to request an affiliation between the first user and the discrete set of one or more other users. The group module may be further configured to establish the affiliations responsive to affiliation requests initiated by the users, wherein the first affiliation is established responsive to the affiliation request initiated by the first user.

In implementations, the in-game actions include an affiliation request initiated by the first user to request an affiliation between the first user and the discrete set of one or more other users and an affiliation acceptance from the discrete set of one or more other users responsive to the affiliation request initiated by the first user. The group module may be further configured to establish the affiliations responsive to affiliation acceptances, wherein the first affiliation may be established responsive to the affiliation acceptance from the discrete set of one or more other users.

In implementations, the group module may be configured to establish the affiliations based on attributes of in-game avatars selected by the users.

In implementations, the group module may be configured to establish the affiliations responsive to behavior of the users over time.

In implementations, the behavior of the users over time comprises interactions between the users.

In implementations, one or more relationships exist between the first user and the discrete set of one or more other users based on their inclusion in the first affiliation, the relationships comprising one or both of a leadership relationship and a role relationship.

In implementations, the relationships provide capabilities between the first user and the discrete set of one or more other users that are not available to users not included in an affiliation. The capabilities may include one or more of sharing goods, trading goods, sharing services, trading services, sharing player characters, trading player characters, sharing items, or trading items.

In implementations the content made available to the first user and the discrete set of one or more other users comprises one or more of a new quest, a new map region, a new weapon, a new technology, a new skill, a new troupe, a new mount, or a new power-up available for purchase.

These and other features and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural references unless the context clearly dictates otherwise.

DETAILED DESCRIPTION

Figure 1:
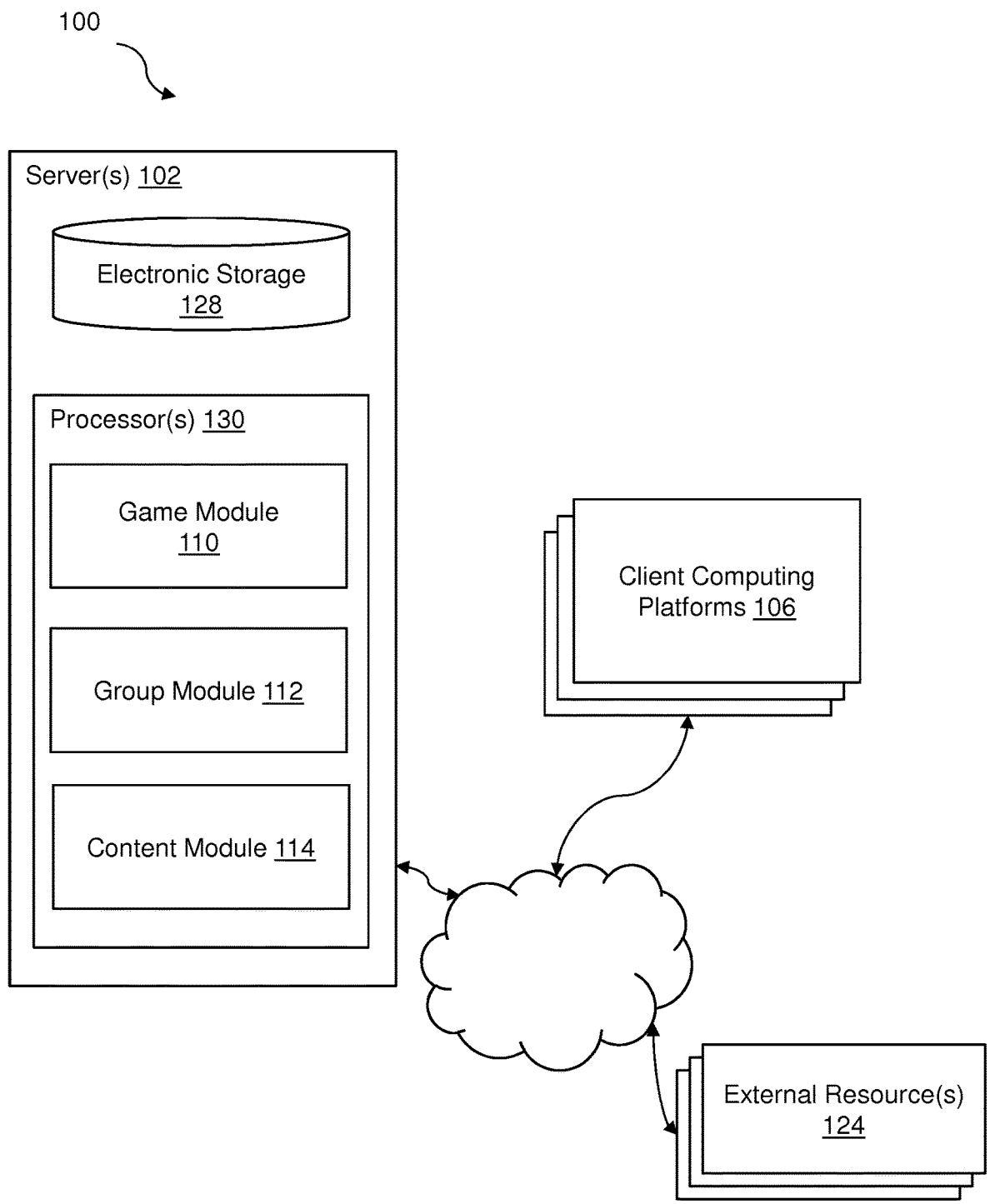
FIG. 1 illustrates a system configured to unlock content for users of an online game based on a number of users within an affiliation, in accordance with one or more implementations.

FIG. 1 illustrates a system 100 configured to unlock game content for users of an online game. In some implementations, system 100 may include one or more servers 102. The server(s) 102 may be configured to communicate with one or more client computing platforms 106 according to a client/server architecture. The users may access system 100 and/or the virtual space via client computing platforms 106, for instance, to engage in one or more online games.

System 100 is only one example of a suitable computing environment and is not intended to suggest any limitation as to the scope of use or functionality of the features described herein. Providing the virtual space may include hosting the virtual space over a network. In this disclosure, a user of an online game may become a member of an affiliation associated with an online game. Content associated with the online game may be made available to the user based on the number of users within the affiliation. The content may be made available to the user individually and independent of other members in the affiliation.

Server(s) 102 may be configured to host one or more online games for one or more gaming providers or games hosted on server(s) 102, and to execute one or more computer program modules associated with the online games to provide access to the online games to a plurality of users. The computer program modules may include one or more of a game module 110, a group module 112, and a content module 114. As noted, the client computing platforms 106 may include one or more computer program modules that are the same as or similar to the computer program modules of the server(s) 102 to facilitate in-game actions.

The game module 110 may be configured to execute an instance of the online game to facilitate presentation of the online game to the users. The game module 110 may be configured to implement in-game actions in the instance of the game in response to requests for in-game actions from the users. In implementations, the users may include a first user and a discrete set of one or more other users. The game may be provided within a virtual space, and may include a plurality of resource types and/or maps. An instance of the virtual space may be executed by computer modules to determine views of the virtual space. The views may then be communicated (e.g., via streaming, via object/position data, and/or other information) from server(s) 102 and/or other sources to client computing platforms 106 for presentation to users. The view determined and transmitted to a given client computing platform 106 may correspond to a user-controlled element. The view determined and transmitted to a given client computing platform 106 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 106) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are provided is not intended to be limiting. The virtual space may be expressed in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated. The user-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 106. The users may interact with each other through communications exchanged within the virtual space. Such communications may include one or more of textual chat, instant messages, private messages, voice communications, and/or other communications. Communications may be received and entered by the users via their respective client computing platforms 106. Communications may be routed to and from the appropriate users through server(s) 102.

In implementations, the in-game actions may include an affiliation request initiated by a first user to request an affiliation between the first user and a discrete set of one or more other users within the virtual space. The action requests input by the users may also include an affiliation acceptance from the discrete set of one or more users responsive to receiving the affiliation request initiated by the first user.

The group module 112 may be configured to establish affiliations between the users within the online game. The group module 112 may be configured to establish and/or manage affiliations within individual virtual spaces. A given affiliation within a given virtual space may include a discrete group of users. For example, a first affiliation within a first virtual space may include a first user, a second user, and/or a discrete set of other users. Examples of an affiliation may include an alliance, a guild, a faction, a club, an association, a group, a crew, a band, a clan, a family, fellowship, a gang, a league, a partnership, a syndicate, a society, a tribe, a troup, a company, and/or other affiliations that include a discrete group of individuals.

The group module 112 may establish affiliations based on affiliation requests and acceptances received from users. Establishment of an affiliation may be initiated by a single communication (e.g., a request) initiated by a given user requesting an affiliation between the given user and one or more other users. Establishment of an affiliation may require a first communication from the given user to be approved by the one or more other users. According to some implementations, the group module 112 may establish affiliations intrinsically within the virtual space (e.g., faction-mates are formed based on avatar configuration), through recognized user behavior over time (e.g., raid members or player-versus-player partners), and/or other approaches for establishing affiliations.

Users belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between users may vary across different virtual spaces. For example, a relationship between the first user and the second user in the first affiliation within the first virtual space may have a different functional significance than a relationship between the first user and the second user in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among users belonging to an affiliation.

The content module 114 may be configured to determine content in the online game made available to a first user and/or a discrete set of one or more other users of an affiliation. In implementations, the new content made available to the first user and/or the discrete set of one or more other users may include one or more of a new quest, a new map region, a new weapon, a new technology, a new skill, a new troupe, a new mount, or a new power-up available for purchase. The content in the online game may be made available to the first user, and/or the discrete set of one or more other users of the affiliation, individually and independent of the other users included in the first affiliation.

The content in the online game may be made available to the first user and/or a discrete set of one or more other users of the affiliation based on a number of users included in the affiliation. As the number of users included in the first affiliation increases, new content may be made available to the first user and/or the discrete set of one or more other users of the affiliation. In implementations, the content made available may be accessed by the first user individually and independent of other users included in the first affiliation. As such, the first user may access the content made available to the first user for aspects of the online game that are associated with the affiliation, as well as aspects of the online game that are not associated with the affiliation. For example, the first user may access the content made available to the first user in player versus player game play where the first user competes directly with other users of the affiliation, player versus environment gameplay where the first user completes quests independently of the affiliation, or other in-game tasks, for example to gain in-game points, etc. As the number of users included in the first affiliation increases beyond certain thresholds, additional content may be made available to the first user and/or the discrete set of one or more other users of the affiliation. For example, first content may be made available to the first user if the affiliation expands to include at least one hundred users, and second content may be made available to the first user if the affiliation expands to include at least five hundred users.

In some implementations, the server(s) 102, client computing platforms 106, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platforms 106, and/or external resources 124 may be operatively linked via some other communication media.

A given client computing platform 106 may include one or more processors configured to execute computer program modules. The computer program modules may be configured to enable an expert or user associated with the given client computing platform 106 to interface with system 100 and/or external resources 124, and/or provide other functionality attributed herein to client computing platforms 106. By way of non-limiting example, the given client computing platform 106 may include one or more of a desktop computer, a laptop computer, a handheld computer, a tablet computing platform, a NetBook, a Smartphone, a gaming console, and/or other computing platforms.

External resources 124 may include sources of information, hosts and/or providers of virtual environments outside of system 100, external entities participating with system 100, and/or other resources. In some implementations, some or all of the functionality attributed herein to external resources 124 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s).

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 102 may store software algorithms, information determined by processor 130, information received from server(s), information received from client computing platforms 106, and/or other information that enables server(s) to function as described herein.

Processor(s) 130 is configured to provide information processing capabilities in server(s) 102. As such, processor 130 may include one or more of a digital processor, an analog processor, a digital circuit designed to process information, an analog circuit designed to process information, a state machine, and/or other mechanisms for electronically processing information. Although processor 130 is shown in FIG. 1 as a single entity, this is for illustrative purposes only. In some implementations, processor 130 may include a plurality of processing units. These processing units may be physically located within the same device, or processor 130 may represent processing functionality of a plurality of devices operating in coordination. The processor 130 may be configured to execute modules 110, 112, and 114. Processor 130 may be configured to execute modules 110, 112, and 114 by software; hardware; firmware; some combination of software, hardware, and/or firmware; and/or other mechanisms for configuring processing capabilities on processor 130. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 110, 112, and 114 are illustrated in FIG. 1 as being implemented within a single processing unit, in implementations in which processor 130 includes multiple processing units, one or more of modules 110, 112, and 114 may be implemented remotely from the other modules. The description of the functionality provided by the different modules 110, 112, and 114 described below is for illustrative purposes, and is not intended to be limiting, as any of modules 110, 112, and 114 may provide more or less functionality than is described. For example, one or more of modules 110, 112, and 114 may be eliminated, and some or all of its functionality may be provided by other ones of modules 110, 112, and 114. As another example, processor 130 may be configured to execute one or more additional modules that may perform some or all of the functionality attributed below to one of modules 110, 112, and 114.

Figure 2:
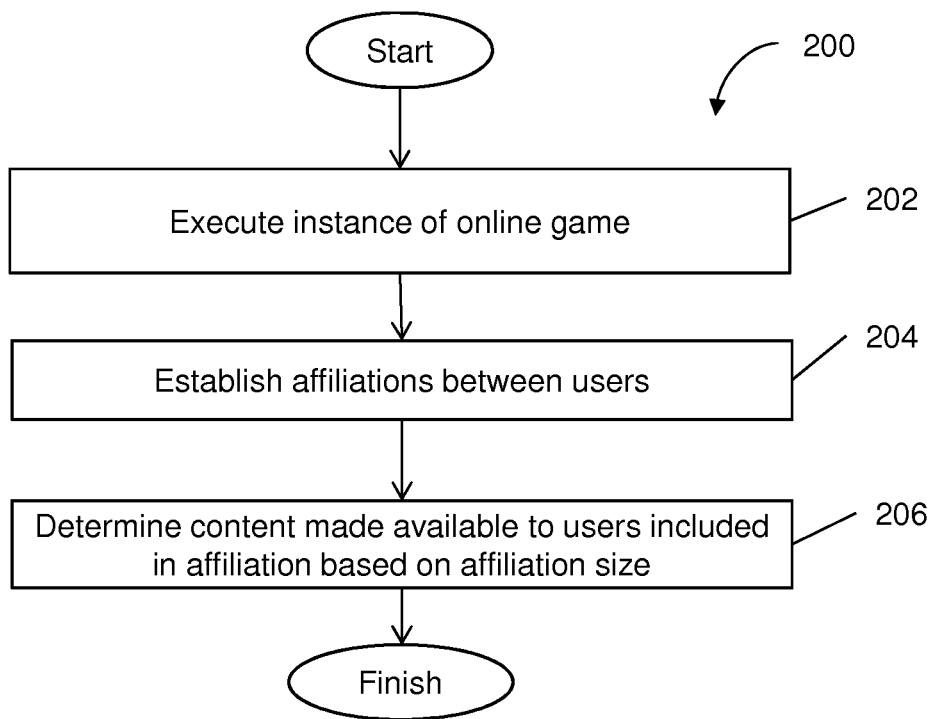
FIG. 2 illustrates a method of unlocking content for users of an online game based on a number of users within an affiliation in accordance with one or more implementations.

FIG. 2 illustrates a method of unlocking game content for users of an online game based on the number of users within an affiliation. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of the online game may be executed to facilitate presentation of the online game to the users. Additionally, in-game actions in the instance of the online game may be implemented in response to requests for in-game actions from users. The users associated with the online game may include a first user and a discrete set of one or more other users. Operation 202 may be performed by a game module that is the same as or similar to game module 110, in accordance with one or more implementations.

At an operation 204, affiliations between users within the online game may be established. The affiliations may include a first affiliation including the first user and the discrete set of one or more other users. Affiliations may be established based on receiving affiliation requests and/or affiliation acceptances from users. In implementations, the received affiliation requests may be transmitted from users of the online game that desire to be part of the affiliation, and the affiliation acceptances may be from users that are in the affiliation. Affiliations may alternatively or additionally be established based on attributes of in-game avatars selected by the users and/or behavior of the users over time, including interactions between the users. Thus, affiliations may be, for example, formed automatically between users having avatars of the same race, class, specialty, and/or region, and/or between users who interact with one another, e.g. in a cooperative manner, frequently.

Affiliations may include various defined relationships between users in the affiliation, including leadership and/or role relationships. These relationships may have in-game effects, for example a user having a management leadership role in an affiliation may be able to decide the location of the affiliation meeting place and/or have veto power over new members, while a user having a negotiator role may have a unique ability to interact with other affiliations, e.g. remotely. Operation 204 may be performed by a group module that is the same as or similar to group module 112, in accordance with one or more implementations.

At an operation 206, content made available to the first user and/or the discrete set of one or more other users included in the first affiliation is determined based on the number of users in the affiliation. Additional content to make available to the affiliation users may be determined based on the size of the affiliation exceeding threshold levels. For example, some additional content may be made available when the affiliation size grows to 10 users, further content at a size of 100 users, at 500 users, etc. Content made available may include new quests, new map regions, new weapons, new technologies, new skills, new troupes, new mounts, new power-ups available for purchase, etc. Thus, by way of example, all users in an affiliation might gain access to a new weapon when the size of the affiliation reaches 10 users, and the new weapon may be unavailable to users who are not members of affiliations having at least 10 members. At 100 users, the users in the affiliation might gain access to a new map region to explore and some new skills. Content made available at various affiliation sizes may vary between affiliations based on characteristics of the affiliations and/or their members, and/or other factors. Thus, not all affiliations in a given online name need receive access to the same new content at the same affiliation sizes.

In implementations, the content made available may be accessed by the first user individually and independent of other users included in the first affiliation. As such, the first user may access the content made available to the first user for aspects of the online game that are associated with the affiliation as well as aspects of the online game that are not associated with the affiliation, such as player versus player game play where the first user competes directly with other users of the affiliation, player versus environment gameplay where the first user completes quests independent from the affiliation, or other in-game tasks to gain in-game points, etc. Thus, for example, a new map region made available to users of an affiliation may be accessible for exploration by a single user acting on its own without other members of the affiliation. Operation 206 may be performed by a content module that is the same as or similar to content module 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for unlocking game content for users of an online game, wherein the users are associated with client computing platforms, the system comprising:
   one or more processors configured by machine-readable instructions to:
      execute one or ore instances of the online game to facilitate presentation of the online game to the users, and implement in-game actions in the one or more instances of the online game under control of the users, wherein the users include a first user and a set of one or more other users, wherein the first user is associated with a first client computing platform configured to transmit information via a network to the system, wherein the first user and the set of one or more other users are included in a first affiliation of users that remains consistent across the one or more instances such that individual users within the first affiliation have one or more capabilities that are not available to users not within the first affiliation;
      determine a first affiliation size, wherein the first affiliation size represents how many users are included in the first affiliation;
      compare the first affiliation size to a threshold number of users; and
      responsive to the first affiliation size breaching the threshold number of users, make content n the online game available to the first user, wherein the content in the online game is not available to the first user prior to the first affiliation size breaching the threshold number of users.

2. The system of claim 1, wherein the content is not made available to the other users included in the first affiliation.

3. The system of claim 1, wherein the one or more processors are further configured by machine-readable instructions to establish the first affiliation responsive to receiving, from the first client computing platform, a first affiliation request to establish the first affiliation.

4. The system of claim 1, wherein the one or more processors are further configured by machine-readable instructions to establish the first affiliation responsive to receiving one or more individual affiliation acceptances from individual users in the set of one or more other users, wherein an individual affiliation acceptance indicates an individual user has joined the first affiliation.

5. The system of claim 1, wherein the one or more processors are further configured by machine-readable instructions to establish the first affiliation such that the first affiliation is persistent over time.

6. The system of claim 5, wherein the first affiliation has a functional significance within the online game that is persistent over time.

7. The system of claim 1, wherein one or more relationships exist between the first user and the set of one or more other users based on their inclusion in the first affiliation, the one or more relationships comprising one or both of a leadership relationship and a role relationship.

8. The system of claim 7, wherein the one or more relationships provide capabilities between the first user and the set of one or more other users that are not available to users not included in the first affiliation, the capabilities comprising one or more of sharing goods, trading goods, sharing services, trading services, sharing player characters, trading player characters, sharing items, and/or trading items.

9. The system of claim 1, wherein the content made available to the first user comprises one or more of a new guest, a new map region, a new weapon, a new technology, a new skill, a new troupe, a new mount, and/or a new power-up available for purchase.

10. A computer-implemented method for content being made available to users of an online game, wherein the users are associated with client computing platforms, the method being implemented in a computer system that includes one or more processors configured by machine-readable instructions, the method comprising:
   executing one or more instances of the online game to facilitate presentation of the online game to the users, and to implement in-game actions in the one or ore instances of the online game under control of the users, wherein the users include a first user and a set of one or more other users, wherein the first user is associated with a first client computing platform that transmits information via a network to the computer system, wherein the first user and the set of one or more other users are included in a first affiliation of users that remains consistent across the one or more instances such that individual users within the first affiliation have one or more capabilities that are not available to users not within the first affiliation;

determining a first affiliation size, wherein the first affiliation size represents how many users are included in the first affiliation;

comparing the first affiliation size to a threshold number of users; and responsive to the first affiliation size breaching the threshold number of users, making content in the online game available to the first user, wherein the content in the online game is not available to the first user prior to the first affiliation size breaching the threshold number of users.

11. The method of claim 10, wherein the content is not made available to the other users included in the first affiliation.

12. The method of claim 10, further comprising establishing the first affiliation responsive to receiving, from the first client computing platform, a first affiliation request to establish the first affiliation.

13. The method of claim 10, further comprising establishing the first affiliation responsive to receiving one or more individual affiliation acceptances from individual users in the set of one or more other users, wherein an individual affiliation acceptance indicates an individual user has joined the first affiliation.

14. The method of claim 10, further comprising establishing the first affiliation such that the first affiliation is persistent over time.

15. The method of claim 14, wherein establishing the first affiliation comprises: initiating the first affiliation request by transmission of information via the first client computing platform from the first user.

16. The method of claim 10, wherein one or more relationships exist between the first user and the set of one or more other users based on their inclusion in the first affiliation, the one or more relationships comprising at least one of a leadership relationship and a role relationship.

17. The method of claim 16, wherein the one or more relationships provide capabilities between the first user and the set of one or more other users that are not available to users not included in the first affiliation, the capabilities comprising at least one of sharing goods, trading goods, sharing services, trading services, sharing player characters, trading player characters, sharing items, and trading items.

18. The method of claim 10, wherein the content made available to the first user comprises at least one of a new quest, a new map region, a new weapon, a new technology, a new skill, a new troupe, a new mount, and a new power-up available for purchase.

* * * * *